United States Patent [19]

Charland

[11] Patent Number: 5,661,776
[45] Date of Patent: Aug. 26, 1997

[54] METHOD AND APPARATUS FOR PERFORMING IMPEDANCE MEASUREMENTS ON A COMMUNICATION LINE

[75] Inventor: Claude Charland, Boisbriand, Canada

[73] Assignee: Atlas Telecom International Ltd., Canada

[21] Appl. No.: 468,188

[22] Filed: Jun. 6, 1995

Related U.S. Application Data

[62] Division of Ser. No. 978,970, Nov. 20, 1992.

[51] Int. Cl.$^6$ .......................... H04M 1/24; H04M 3/22
[52] U.S. Cl. ........................ 379/2; 379/29; 379/30
[58] Field of Search .......................... 379/1, 21, 27, 379/26, 29, 30

[56] References Cited

U.S. PATENT DOCUMENTS

| | | | |
|---|---|---|---|
| 4,653,084 | 3/1987 | Ahuja | 379/29 |
| 4,707,850 | 11/1987 | Horton | 379/30 |
| 4,796,290 | 1/1989 | Perry | 379/27 |
| 4,807,277 | 2/1989 | Perry | 379/29 |
| 4,845,736 | 7/1989 | Posner | 379/207 |
| 5,073,919 | 12/1991 | Hagensick | 379/30 |
| 5,195,124 | 3/1993 | Ishioka | 379/29 |
| 5,222,119 | 6/1993 | Asano | 379/2 |
| 5,402,073 | 3/1995 | Ross | 324/539 |

FOREIGN PATENT DOCUMENTS

| | | |
|---|---|---|
| 5576924 | 11/1986 | Australia . |
| 1 241 783 | 9/1988 | Canada . |
| 0 168 840 | 1/1986 | European Pat. Off. . |
| 0 287 369 | 10/1988 | European Pat. Off. . |
| 34 44 872 | 6/1986 | Germany . |
| 35 13 598 | 10/1986 | Germany . |
| 92/17977 | 10/1992 | WIPO . |

*Primary Examiner*—Curtis Kuntz
*Assistant Examiner*—Vijay Shankar
*Attorney, Agent, or Firm*—Larson and Taylor

[57] ABSTRACT

A network termination unit for connection to a telephone line at a predetermined demarcation point for sequentially simulating a plurality of fault conditions to allow a diagnostic routine to be performed on the telephone line at a remote location from the demarcation point. The network termination unit comprises a plurality of semi-conductor switches electrically connected to conductors of the telephone line to establish a network of electrical paths capable of altering the electrical condition of the telephone line when caused to assume a state of conduction. A logic module causes the switches to assume either a closed or an opened condition in accordance with a predetermined sequence established by a hard-wired program.

7 Claims, 10 Drawing Sheets

| STEP | T TALK | R TALK | TIP +48 | TIP -48 | TIP +130 | TIP -130 | RING +48 | RING -48 | RING +130 | RING -130 | GROUND +48 | GROUND -48 | GROUND +130 | GROUND -130 | GROUND +24 | TEST Measurement | TEST Condition |
|---|---|---|---|---|---|---|---|---|---|---|---|---|---|---|---|---|---|
| 1 | | | | | | | | | | | | | | | | A.C. Volts T&R | A.C. Voltage on Network T&R |
| 2 | | | | | | | | | | | | | | | | A.C. Volts T&G | A.C. Voltage on Network T&G |
| 3 | | | | | | | | | | | | | | | | A.C. Volts R&G | A.C. Voltage on Network R&G |
| 4 | | | | | | | | | | | | | | | | D.C. Volts T&R | D.C. Voltage on Network T&R |
| 5 | | | | | | | | | | | | | | | | D.C. Volts T&G | D.C. Voltage on Network T&G |
| 6 | | | | | | | | | | | | | | | | D.C. Volts R&G | D.C. Voltage on Network R&G |
| 7 | X | | | | | | X | | | | X | | | | | D.C. AMPS T&R | 5 Seconds Reset |
| 8 | | | | X | | | | X | | | | | | | | D.C. AMPS T&R | Leakage Res. on Network T&R |
| 9 | | | | X | | | | | | | | X | | | | D.C. AMPS T&G | Leakage Res. on Network T&G |
| 10 | | | X | | | | | X | | | | | | | | D.C. AMPS Tip | Leakage Res. on Network T&G |
| 11 | | | X | | | | | | | | | X | | | | D.C. AMPS Tip | Leakage Res. on Network T&G |
| 12 | | | | | | | | X | | | | X | | | | D.C. AMPS Ring | Leakage Res. on Network R&G |
| 13 | | | X | | | | | X | | | | | | | | D.C. AMPS Ring | Leakage Res. on Network R&G |
| 14 | | | | X | | | | | | | | | | | X | D.C. AMPS T&R | Short to Ground Res. of Network |
| 15 | | | | | | | | X | | | | X | | | | D.C. AMPS T&R | Short to Ground Res. of Network |
| 16 | | | | X | | | | | | | | | | | X | D.C. AMPS T&R | Tip to Ground Res. of Network |
| 17 | | | | X | | | | X | | | | | | | | D.C. AMPS T&R | Tip to Ground Res. of Network |
| 18 | | | | | | | | X | | | | | | | X | D.C. AMPS T&R | Ring to Ground Res. of Network |
| 19 | | | X | | | | | X | | | | | | | | D.C. AMPS T&R | Ring to Ground Res. of Network |
| 20 | | | | X | | | | X | | | | | | | | D.C. AMPS T&R | Loop Resistance of Network |
| 21 | | | | X | | | | X | | | | | | | | D.C. AMPS T&R | Loop Resistance of Netwok |
| 22 | | | | X | | | | X | | | | | | | | D.C. AMPS T&R | Leakage Res. Customer Side T&R |
| 23 | | | | X | | | | | | | | X | | | | D.C. AMPS T&G | Leakage Res. Customer Side T&G |
| 24 | | | X | | | | | X | | | | | | | | D.C. AMPS Tip | Leakage Res. Customer Side T&G |
| 25 | | | X | | | | | | | | | X | | | | D.C. AMPS Tip | Leakage Res. Customer Side T&G |
| 26 | | | | | | | | X | | | | X | | | | D.C. AMPS Ring | Leakage Res. Customer Side R&G |
| 27 | | | | | | | X | | | | | X | | | | D.C. AMPS Ring | Leakage Res. Customer Side R&G |
| 28 | X | | | | | | | | | | X | | | | | D.C. AMPS T&R | 600 Ohms Noise Termination |

Fig. 12

METHOD AND APPARATUS FOR PERFORMING IMPEDANCE MEASUREMENTS ON A COMMUNICATION LINE

This is a division of application Ser. No. 07/978,970 filed Nov. 20, 1992.

FIELD OF THE INVENTION

The invention relates to the general field of diagnostic equipment, more particularly to an electronic device and method for selectively altering the electrical condition of a communication line to allow a diagnostic routine to be performed on the communication line at a remote location from the device. The invention also extends to a novel power supply module capable of drawing electrical energy from a communication line to build-up a charge sufficient to operate an electronic device, such as a network termination unit. Further, the invention extends to a device and method for measuring impedance parameters of a communication line. Yet, the invention is directed to a verification controller for running diagnostic checks on a communication line.

BACKGROUND OF THE INVENTION

As technology evolves in the field of voice and data communications, the need for a reliable method of remotely determining with relative precision whether a fault lies on the network side or on the customer side of a communication line has become very apparent in the industry.

Currently available testing devices are unsatisfactory because they have only limited testing capabilities. As a result, certain fault conditions on the communication line cannot be detected with precision and certainty. Because of such limitations, telecommunication companies have been reluctant to make the massive investment necessary for the wide spread use of such devices on the entire network.

An important design criteria of a fault locating device is its ability to be electrically transparent on the communication line to avoid interfering with normal signal transmissions, either voice or data. This requirement has become more and more important as communication line standards are raised to allow higher data rate transmissions.

It has been clearly demonstrated that any significant parasitic effects introduced by a fault locating device in the inductive reactance, capacitive reactance, leakage resistance and series resistance of the loop can significantly degrade the quality of the signal transmission. Certain fault locating devices which have been made available during the past recent years are designed to purposely introduce termination networks on the tip and ring conductors of a telephone line to provide a characteristic impedance that is used as a unique signature. In the test mode, such devices are designed to selectively place the customer side of the telephone line in an open-circuited state. To achieve this function, four-layer diode circuits are sometimes used in serial connection with the telephone line. However, such diode circuits introduce a significant voltage drop across their terminals, in the order of 1.2 volts. If a peripheral apparatus is connected in series with the telephone line, a cumulative voltage drop of as much as 3.2 volts is produced which can adversely affect the operating limits of the telephone line.

OBJECTS AND STATEMENT OF THE INVENTION

An object of the present invention is an improved device and method for altering the electrical condition of a communication line to allow a diagnostic routine to be performed on the line at a location remote from the device.

Another object of the invention is an improved device for altering the condition of a communication line specifically provided for carrying data signals, without superimposed talk battery (hereinafter "talk battery" shall designate a source of energy which is substantially free from interferences and used for speech transmission) to allow a diagnostic routine to be performed on the communication line at a remote location from the device.

Another object of the invention is a method for simulating a plurality of fault conditions on a communication line provided for carrying relatively weak data signals without a superimposed talk battery.

Another object of the invention is a novel power supply module for connection to a communication line capable of drawing electrical energy therefrom to build-up a charge sufficient to operate an electronic device.

Yet, another object of the invention is a method and a device for altering the electrical condition of a communication line to allow impedance measurements to be performed on the communication line at a remote location from the device.

As embodied and broadly described herein, the invention provides a device for sequentially altering the condition of a communication line to allow a diagnostic routine to be performed on the communication line at a remote location from the device, said device comprising:

a plurality of switches for electrical connection to first and second conductors of the communication line to establish a network of electrical paths capable of altering an electrical condition of the communication line, each switch being capable of assuming an opened condition and a closed condition for controlling a state of conduction of a respective electrical path, in the opened condition the switch manifesting a high impedance to substantially prevent passage of electrical current therethrough, in the closed condition the switch manifesting a low impedance to allow passage of electrical current therethrough; and a logic module capable of actuating said switches to either one of said conditions, the logic module being responsive to a trigger signal to alter the condition of said switches in accordance with a predetermined sequence, thereby actuating respective electrical paths to a state of conduction at predetermined instants in time.

In a most preferred embodiment, the device comprises:

a) a first switch in series with the first conductor of the communication line to cause the conductor to assume an open-circuited state when the switch assumes the opened condition;

b) a second switch in series with a second conductor of the communication line to cause the conductor to assume an open-circuited state when the switch assumes the opened condition;

c) a third switch between the first conductor of the communication line and the ground in order to ground the first conductor when the switch is in the closed condition;

d) a fourth switch between the second conductor of the communication line and the ground in order to ground the second conductor when the switch assumes the closed condition;

e) a fifth switch across the first and the second conductors of the communication line in order to create a short-circuit between them when the switch is in the closed condition; and f) a sixth switch in series with a 600 ohm or a 900 ohm resistance connected across the first and the second conductors of the communication line in order to establish a quiet termination impedance on the line providing a continuous DC path, when the switch is closed.

Advantageously, each switch is a solid-state bistable device comprising a pair of field effect transistors (hereinafter "FET") which are connected in series to form a bidirectional electric path. To actuate the semi-conductor switch a FET driver circuit is provided to impress a triggering voltage on the gate terminals of the field effect transistors in response to an actuation signal applied to the FET driver circuit by the logic module.

Preferably, the sequence of actuation of the various semi-conductor switches is established by a hard-wired program built in the logic module, which is fixed during the manufacture of the device and not subject to change. More specifically, the logic module includes a counter to which is applied a pulse train at a predetermined frequency. A gate array constituted by a matrix of elementary logic gates translates the current output condition of the counter into signals triggering selected semi-conductor switches to the state of conduction in order to simulate a certain fault condition on the line. At the following clock pulse, the counter switches to the next output condition causing the gate array to reconfigure the operative states of the semi-conductor switches. The sequence proceeds automatically in a timed relationship with the clock pulses until the counter cycle is completed.

During normal utilisation of the communication line the logic module remains in a quiescent state. In this condition the logic module maintains the first and the second semi-conductor switches which are in series with the first and the second conductors of the communication line, respectively, in a short-circuited state to allow communication signals to travel unobstructed on the line. In response to a trigger signal, the logic module assumes an active mode and initiates the predetermined switch actuation sequence. Upon completion of the sequence, the logic module automatically returns to its quiescent state and restores the line.

Most preferably, the trigger signal to actuate the logic module is transmitted directly on the communication line. The trigger signal may take various forms depending upon the intended application. A distinctive momentary electrical condition on the communication line, easily recognizable by the logic module can be employed, such as a short to ground between the line conductors, or the application of a voltage at a predetermined level and polarity. More sophisticated trigger signals can also be used, such as binary codes for example, permitting to selectively actuate one among several devices connected to the same communication line, by generating the actuation code specific to the targeted unit.

The device in accordance with the invention preferably includes a rechargeable power supply module that builds-up an energy charge while the logic module is in the quiescent state, sufficient to power the logic module during at least one operative cycle. The power supply module includes a charge storage device, such as a capacitor drawing electric power supplied on the communication line.

As embodied and broadly described herein, the invention also provides a network termination unit for connection to a telephone line at a predetermined demarcation point thereon for sequentially simulating a plurality of fault conditions on the telephone line to allow a diagnostic routine to be performed on the telephone line at a remote location from the demarcation point, said network termination unit comprising:

first and second bistable switches for connection in series with tip and ring conductors, respectively, of the telephone line;

third and fourth bistable switches for connection across the tip and ring conductors, respectively, of the telephone line and the ground;

a fifth bistable switch for connection across the tip and ring conductors of the telephone line, each of the bistable switches being capable of assuming a first operative condition in which the switch in a short-circuited state and a second operative condition in which the switch is in an open-circuited state; and a logic module capable of actuating the bistable switches to either operative condition thereof, said logic module being programmed to set each bistable switch in a predetermined operative condition at a predetermined instant in time, whereby causing at the demarcation point on the telephone line a succession of simulated fault conditions permitting to effect a diagnostic routine on the telephone line by measuring parameters of the telephone line in a timed relationship with the succession of simulated fault conditions thereon.

As embodied and broadly described herein, the invention provides a device for altering the condition of a communication line to allow a diagnostic routine to be performed on the communication line at a remote location from the device, said device comprising:

a solid-state switch for connection in series to a conductor of the communication line, the solid-state switch being capable of assuming either one of an open condition and a closed condition for controlling a state of conduction of an electrical path established by the solid-state switch, in the open condition the switch manifesting a high impedance to substantially prevent passage of electrical current therethrough, in the closed condition the switch manifesting a low impedance to allow passage of electrical current therethrough, the solid-state switch assuming the closed condition in absence of electrical energy, supplied thereto; and a logic module capable of actuating the solid-state switch to either one of the conditions to selectively alter the electrical condition of the communication line.

In order to maintain the electrical transparency of the device in accordance with the invention, the semi-conductor switches which are in series with the conductors of the communication line must be in the short-circuited state to maintain the continuity of the electric path of the line when the device is the quiescent state. In telephone line applications the talk battery which is continuously impressed across the tip and ring conductors of the line may be used by the logic module in order to continuously maintain the first and the second semi-conductor switches in a state of conduction to allow the normal propagation of signals on the line. Accordingly, normally-opened solid-state switches can be used for the construction of the device since at all times the logic module receives power in order to maintain the solid-state switches in the desired state of conduction.

However, this set-up is unsuitable for communication lines dedicated to data transmission which carry only weak signals without superimposed talk battery. As broadly defined herein, this potential difficulty is avoided by using semi-conductor switches in serial connection with conductors of the line which are normally-closed, such as depletion FETs.

In a most preferred embodiment, the first and second switches of the device are constituted by normally-closed semi-conductor switches, while for the second, third, fourth and sixth switches which should remain in the open-circuited state during the normal use of the line, common normally-closed semi-conductor switches, are satisfactory.

As embodied and broadly described herein, the invention further provides a method for simulating a plurality of fault conditions on a communication line provided for carrying relatively week data signals, said method comprising the steps of:

connecting to a predetermined point on the communication line a device which includes:

a) a plurality of switches for electrical connection to first and second conductors of the communication line to establish a network of electrical paths capable of altering an electrical condition of the communication line, each switch being capable of assuming an opened condition and a closed condition for controlling a state of conduction of a respective electrical path, in said opened condition the switch manifesting a high impedance to substantially prevent passage of electrical current therethrough, in said closed condition the switch manifesting a low impedance to allow passage of electrical current therethrough;

b) a logic module capable of actuating said switches to either one of said conditions, said logic module being responsive to a trigger signal to alter the condition of said switches in accordance with a predetermined sequence, thereby causing respective electrical paths to assume a desired state of conduction at predetermined instants in time.

c) a power supply module for supplying electrical power to said logic module, said power supply module including a charge storage device capable of accepting electrical energy from the communication line to build-up a sufficient charge for actuating said logic module, said method composing the steps of:

establishing on the communication line a voltage at a level significantly higher than an amplitude of the relatively week data signals normally transmitted on the communication line for charging said charge storage device; and triggering said logic module to sequentially alter the electrical condition of the communication line.

For telephone line applications, the power supply module of the device is maintained continuously charged since a DC talk battery voltage is impressed at all times across the tip and the ring conductors. However, for dedicated data transmission lines which lack such continuous DC voltage, the power supply module would not be able to charge itself in order to furnish the necessary operating voltage and current to the logic module. The present inventor has discovered that this difficulty can be obviated by impressing across the conductors of the dedicated data transmission line a voltage of a sufficient magnitude to recharge the power supply module. Upon completion of the charging cycle, a trigger signal is generated to actuate the logic module.

As embodied and broadly described herein, the invention further provides a power supply module for connection to a communication line for drawing electrical energy therefrom to build-up a sufficient charge to operate an electronic device, said power supply module including:

an inductance for serial connection with a first conductor of the communication line, upon impression of a variable voltage on the communication line a variable current being caused to circulate in the first conductor giving rise to an electric potential across said inductance; and a capacitor electrically connected to said inductance to draw a charge from said inductance.

The most important advantage of the above defined power supply module resides in that it can build-up an operative charge even when the conductors of the line are short-circuited downstream of the power supply module. The ability of the power supply module to recharge itself in such conditions greatly enhances the functionality of the device by allowing it to operate on disrupted communication lines.

Most preferably, the power supply module comprises an inductance in series with a conductor of the line and a capacitor connected to a terminal of the inductance through a diode providing an unidirectional path. By impressing across the first and the second conductors of the communication line a variable voltage, variable current is created through the inductance which, in turn, generates a potential across its terminals that is sufficient to charge the capacitor through the diode. It will be appreciated that a short circuit between the first and the second conductors of the communication line, downstream the power supply module will not significantly affect the charging operation since the inductance acts as a local source, producing a succession of voltage pulses to pump a sufficient charge in the capacitor. The diode prevents the capacitor from being discharged through the short circuited first and second conductors of the communication line, thereby maintaining the capacitor in the operative state long after the charging cycle has been completed.

As embodied and broadly described herein, the invention also provides a device for altering the electrical condition of a communication line to allow impedance measurements to be performed on the communication line at a remote location from said device, said device comprising:

a first and second switches formed on a single semi-conductor chip for connection in parallel to a first conductor of the communication line, each switch establishing a respective electrical path capable of altering the electrical condition of the communication line, each switch being capable of assuming an opened condition and a closed condition for controlling a state of conduction of a respective electrical path, in said opened condition the switch manifesting a high impedance to substantially prevent passage of electrical current therethrough, in said closed condition the switch manifesting a low impedance to allow passage of electrical current therethrough, said first and second switches having similar impedance characteristics; and a logic module capable of actuating said switches to either condition thereof, said logic module constituting means for:

a) during a first time interval maintaining said first switch in said closed condition and maintaining said second switch in said opened condition; and b) during a second time interval maintaining said first and second switches in said closed condition, whereby successive impedance measurements of the communication line during said first and second time intervals permitting to determine with relative precision a parasitic impedance of said first and second switches.

Routine maintenance and testing procedures performed on the communication line include various impedance measurements to determine the current value of some parameters such as the loop resistance of the communication line or whether the line is balanced with reference to ground. During such impedance measurements the testing device in accordance with the invention can be utilized to selectively configure the line to allow the necessary measurements to be performed from a remote location. However, invariably, the semi-conductor switches used to alter the electrical condition of the line introduce parasitic resistance that affects the accuracy of the impedance measurements.

The device broadly defined above overcomes this difficulty and allows to obtain meaningful impedance results by permitting to remotely determine the parasitic impedance of the semi-conductor switches. Such parasitic impedance can then be used to calculate a correction factor to adjust the impedance values directly measured on the line.

It is known to those skilled in the art that semi-conductor devices manufactured by large scale integration techniques on silicon chips have electric parameters which can vary within several percent from one production run to another due to minute variations in the manufacturing process conditions. However, semi-conductor devices on the same chip have extremely similar characteristics since they have been manufactured under identical process conditions. The present invention makes use of this phenomenon and allows to determine the intrinsic impedance of each switch by effecting successive impedance line measurements with one switch connected and then both switches connected in parallel on the line.

As embodied and broadly described herein, the invention also provides a method for measuring an impedance parameter of a communication line, said method comprising the steps of:

a) connecting at a certain location on the communication line a first and second switches formed on a single semiconductor chip, in parallel to a first conductor of the communication line, each switch establishing a respective electrical path for altering the electrical condition of the communication line, each switch being capable of assuming an opened condition and a closed condition for controlling a state of conduction of a respective electrical path, in said opened condition the switch manifesting a high impedance to substantially prevent passage of electrical current therethrough, in said closed condition the switch manifesting a low impedance to allow passage of electrical current therethrough, said first and second switches having similar impedance characteristics;

b) maintaining said first switch in said closed condition and said second switch in said opened condition for a first time period;

c) measuring an impedance parameter of the communication line at a point remote from said certain location during said first time period;

d) maintaining said switches in said closed condition during a second time period;

e) measuring an impedance parameter during said second time period;

f) deriving from impedance values obtained at steps c) and e) a correction factor representative of a parasitic impedance of said switches; and g) utilizing said correction factor to derive with a relative precision a value of an impedance parameter of the communication line.

As embodied and broadly described herein, the invention provides an apparatus for performing a diagnostic cycle on a telephone line, said apparatus comprising: .

first means for establishing a predetermined electrical condition on said telephone line, said predetermined electrical condition constituting an actuation signal for a device acting on said telephone line at a location remote from said apparatus to alter in a predetermined sequence the condition of the electrical path established by the telephone line;

second means for measuring different electric parameters of said telephone line in a timed relationship with the variation of the condition of the telephone line electrical path caused by said device; and third means responsive to said second means processing results from measurements by said second means to identify a detectable fault on said telephone line.

BRIEF DESCRIPTION OF THE DRAWINGS

FIG. 12 is a table of the verification controller test sequence;

DESCRIPTION OF PREFERRED EMBODIMENTS

The present invention provides a network termination unit intended to be installed on a communication line, be it voice or data, in order to simulate on the line a variety of fault conditions such as short to ground, short between conductors of the line, open circuits in the conductors, among others, to enable a verification controller installed at a remote location, typically at a central station from which the communication line originates, to perform a diagnostic routine.

Figure 1:
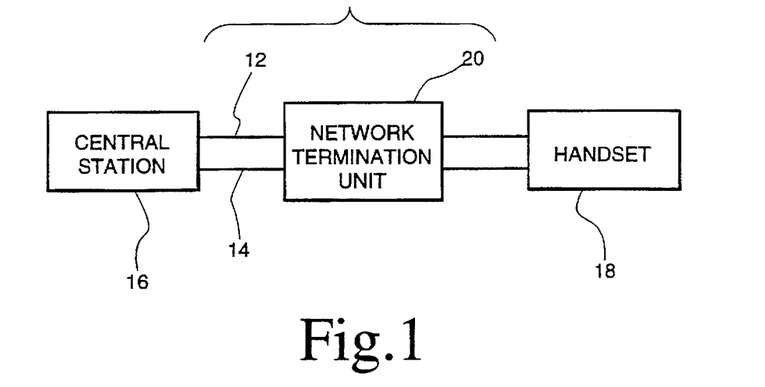
FIG. 1 is a schematical diagram of a communication line incorporating a network termination unit in accordance with the invention, installed at a demarcation point between the network side and the customer side of the line.

A typical lay-out of a communication line including a network termination unit is shown in FIG. 1. The communication line, which in this case is a telephone line designed to carry analog voice signals, is identified comprehensively by the reference numeral 10, and comprises a pair of conductors namely a tip conductor 12 and a ring conductor 14. The telephone line 10 originates from a central station 16 and leads to a telephone handset 18 of a subscriber. A network termination unit 20 is mounted on the telephone line 10 at a demarcation point between the subscriber side of the line and the network side thereof. Typically, the network termination unit 20 would be located on the subscriber premises where the telephone line 10 enters the dwelling.

Figure 2:
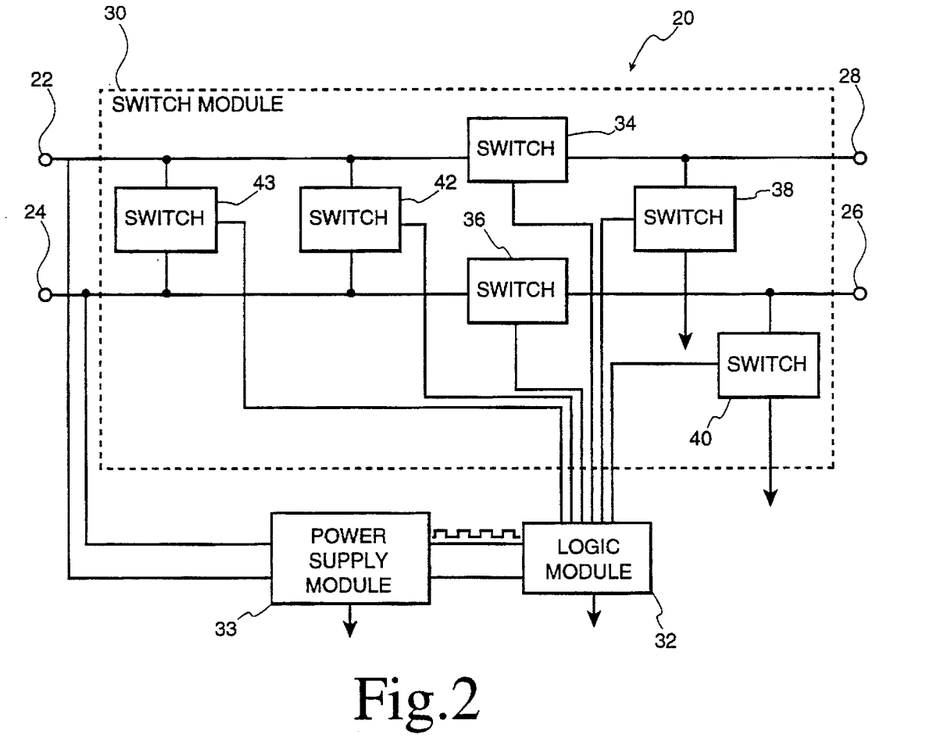
FIG. 2 is a block diagram of the network termination unit in accordance with the invention.

With reference to FIG. 2, the network termination unit 20 is connected in series with the telephone line 10 and at this end it comprises input leads 22 and 24 connected to the tip and ring conductors of the network side of the line and output leads 26 and 28 connected to the tip and ring conductors of the subscriber side of the line.

The network termination unit 20 includes three main modules namely a switch module 30 (shown in dashed lines) which establishes a network of electric paths capable of altering the electrical condition of the telephone line, a logic module 32 controlling the operation of the switch module 30 and a power supply module 33 that accumulates an electric charge from voltage impressed across the tip and ring conductors of the line in order to power the logic module when the network termination unit 20 is actuated. The power supply module 33 is also designed to generate a clock signal at a predetermined frequency which regulates the operation of the logic module 32.

The switch module 30 is constituted by the following switches:

a) a tip switch 34 mounted in series with the tip conductor of the telephone line;
b) a ring switch 36 mounted in series with the ring conductor of the telephone line;
c) a tip to ground switch 38 connected between the tip conductor of the telephone line and the ground;
d) a ring to ground switch 40 connected between the ring conductor of the telephone and the ground;
e) a short switch 42 connected across the tip and ring connectors of the telephone line;
f) a termination switch 43 connected across the tip and ring conductors of the telephone line and incorporating in series a 600 ohm or a 900 ohm quiet termination impedance.

Each switch is a solid-state semi-conductor device which establishes a bistable electric path capable to assume either a short-circuited condition or an open-circuited condition in response to an actuation signal generated by the logic module 32.

Figure 3:
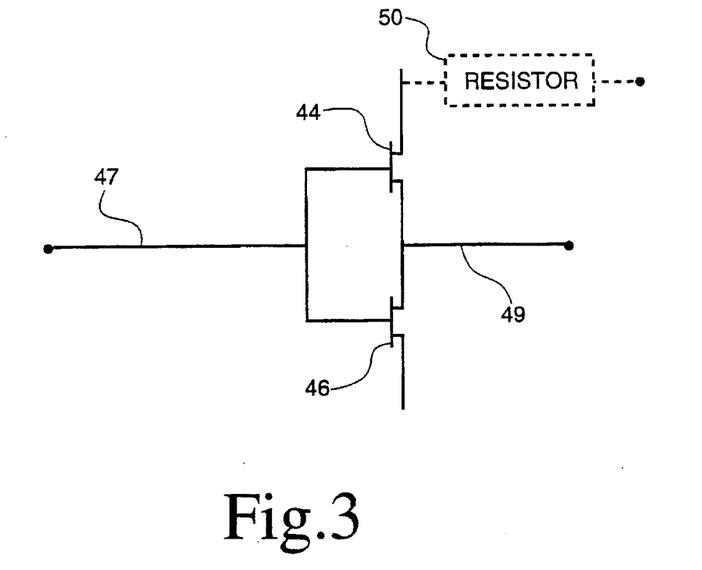
FIG. 3 is a schematical diagram of a solid-state semiconductor switch used in the network termination unit shown in FIG. 2.

A typical configuration of a semi-conductor switch is shown in FIG. 3. The switch comprises a pair of "N" channel CMOS hex FETs 44 and 46 connected by their drain terminals to form a bidirectional electric path ending by the respective source terminals of the FETs. The FETs 44 and 46 are triggered to conduct by applying a bias signal across the gate terminals 47 and the drain terminals 49. In this state, the FETs 44 and 46 are in a saturated condition manifesting a relatively low resistance, in the order of approximately 4 ohms and conducting in both directions, behaving like an AC analog switch. When the bias signal is discontinued, the FETs 44 and 46 assume a non-conducting state, in which their intrinsic impedance rises to very high levels to prevent passage of current therethrough.

The above circuit description applies to all switches 34 to 43. In the switch 43, a resistance 50 (shown in dashed lines in FIG. 3) is added in series with the FETs 44 and 46 which serves as a quiet termination impedance for noise readings on the telephone line. Most preferably, the FETs 44 and 46 are selected to possess a relatively high intrinsic resistance, in the order of 100 ohms, which is augmented by the resistance 50 of a selected value to provide a total switch impedance of either 600 or 900 ohms, depending upon the intended application. It should be noted that high internal resistance FETs are only suitable for the switch 43. The remaining switches of the module 30, in which high conductivity is a desirable feature, transistors with the lowest possible intrinsic resistance should be used.

Figure 4:
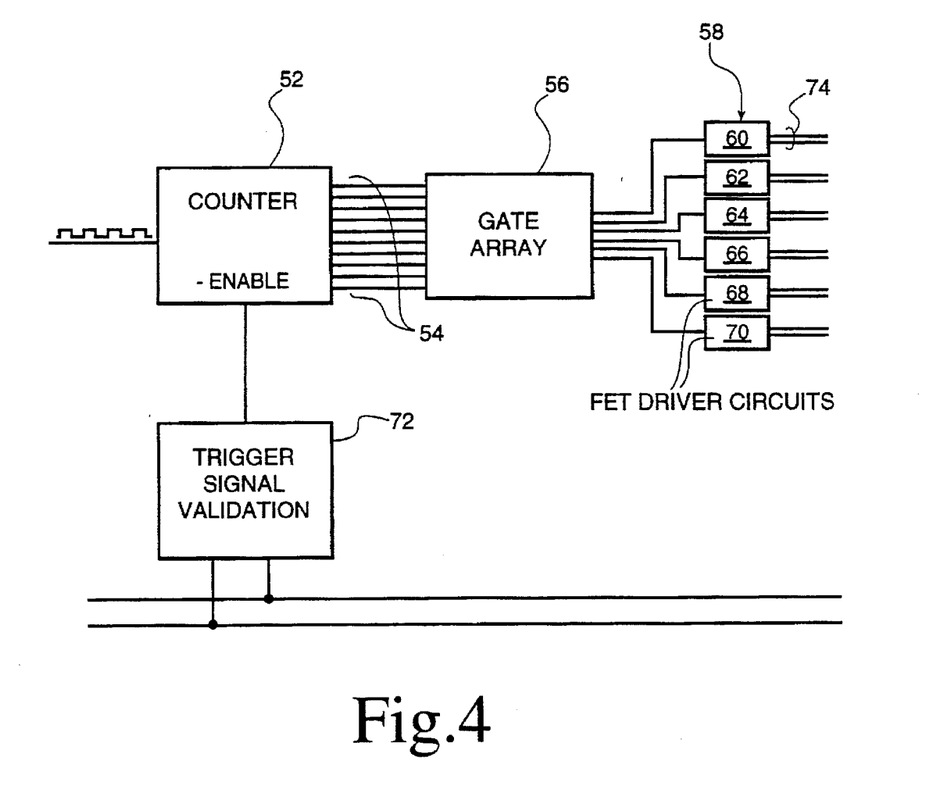
FIG. 4 is a block diagram of the logic module of the network termination unit shown in FIG. 2.

FIG. 4 illustrates the circuit configuration of the logic module 32. A counter 52 which receives the clock signal from the power supply module 33 has its outputs 54 connected to a gate array 56 controlling a FET driver module 58 that includes six independent FET driver circuits 60, 62, 64, 66, 68 and 70 for independently actuating the semi-conductor switches 34, 36, 38 40, 42, and 43, respectively. A validation circuit 72, connected across the tip and ring conductors of the telephone line enables the counter to operate when a valid trigger signal has been detected on the telephone line.

During a test sequence the counter 52 changes its output conditions in response to the clock pulses received from the power supply module 33. Each output condition represents a certain operative state of the switch module 30, simulating a predetermined fault condition on the telephone line by actuating selected switches to the short-circuited state. When the counter 52 steps to a following operative condition the switch module 30 is reconfigured to generate a different fault condition on the telephone line.

The gate array 56 is constituted by a matrix of elementary logic gates and behaves as a decoder, translating the output conditions of the counter 56 into actuation signals for the individual semi-conductor switches 34, 36, 38, 40, 42 and 43. The specific configuration of the elementary gates determines the sequence of actuation of the semi-conductor switches which is fixed during the manufacture of the testing device and it cannot be subsequently altered.

An important design consideration when establishing the logic circuit of the gate array 56 is to maintain the outputs controlling the semi-conductor switches 34 and 36 which are in series with the tip and ring conductors of the telephone line, respectively, active when the counter 52 is in the quiescent state. This feature enables the semi-conductor switches 34 and 36 to assume the short-circuited state to allow normal signal propagation on the line when the testing device is inactive. The logic design to accomplish this function depends upon the state of the outputs of the counter 52 when the later is in the quiescent state and therefore will vary in accordance with the type of counter 52 selected for the intended application.

The FET driver circuits 60, 62, 64, 66, 68 and 70, well known to those skilled in the art are individual amplifiers that generate a bias potential on output leads 74 in response to an actuation signal generated on the respective output of the gate array 56. The output leads 74 are connected to the gate and drain terminals 47 and 49 of the FETs 44 and 46 of a respective switch to trigger the FETs when an actuation signal is impressed on the driver circuit.

The validation circuit 72 may take a variety of forms depending upon the type of trigger signal used to actuate the testing device according to the invention. One possible form of construction utilizes a comparator in which is stored a predetermined signal constituting an unique signature. When an identical signal is transmitted on the line, the comparator recognizes the match and issues an actuation signal which resets the counter 52 and enables the counter to complete a single counting cycle. This type of validation circuit is highly versatile because the trigger signal addressing the testing device can be made specific to a single unit which permits to remotely actuate a selected testing device among a group of units connected to the same telephone line. It is also possible to use a simpler validation gate which is responsive to a voltage exceeding a certain magnitude or to a short to ground condition to actuate the counter 52.

Figure 5:
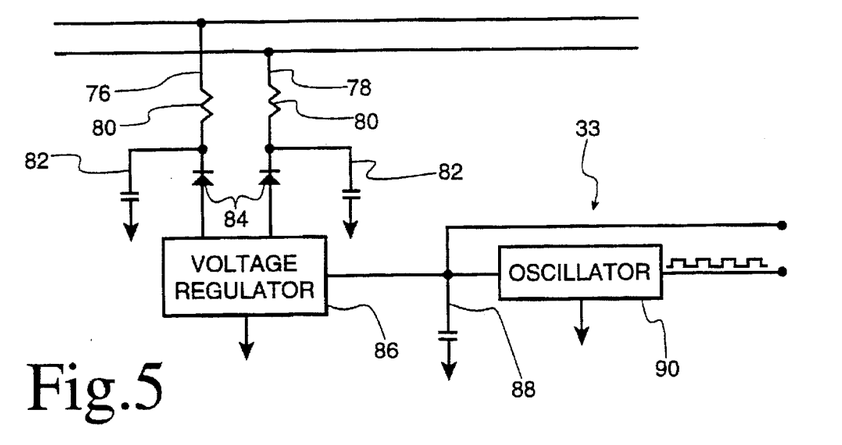
FIG. 5 is a block diagram of the power supply module of the network termination unit shown in FIG. 2.

The power supply module 33 will now be described in connection with FIG. 5. The circuit comprises two input leads 76 and 78 which are connected to the tip and ring conductors, respectively, of the telephone line. Resistors 80 and capacitors 82 provide a low pass filter for the input leads 76 and 78 for bypassing to ground possible AC induction on the telephone line, leaving only the DC component. Diodes 84 allow a negative voltage on either the tip or ring of the telephone line with respect to ground to conduct toward a voltage regulator 86 which charges capacitor 88, acting as a filter and as a charge storage device, maintaining a slow discharge during a testing sequence cycle to furnish the necessary operating voltage and current to the logic module 32.

The capacitor 88 is connected to an oscillator circuit 90 which generates a pulse train at a predetermined frequency, in the order of 20 Hz, which is used to clock the counter 52.

Normally, the logic module 32 is maintained in the quiescent mode in which the gate array 56 supplies voltage only to the FET driver circuits 60 and 62 holding the switches 34 and 36 closed in order to maintain the continuity of the electrical path of the tip and the ring conductors, thereby allowing normal utilization of the telephone line. If it is desired to effect a test sequence on the telephone line, the verification controller in the central station 16 discontinues the application of the talk battery across the tip and ring conductors and generates the required trigger signal on the line to actuate the testing device. The trigger signal is received by the validation gate 72 and if recognized as a valid signature, the counter 52 is reset and enabled to count in order to perform the test sequence. The end of the counting cycle signals the completion of the test sequence which causes the logic module 32 to resume the quiescent state in which only the semi-conductor switches 34 and 36 are maintained operative to restore the telephone line.

A typical testing sequence is provided below.

| STEP | SWITCH(ES) held in the short-circuited state) |
|---|---|
| 1. | switch 34, switch 36, switch 38 and switch 40 |
| 2. | switch 34 and switch 38 |
| 3. | switch 36 and switch 40 |
| 4. | switch 42 |
| 5. | switch 34 and switch 36 |
| 6. | switch 43 |
| 7. | switch 34 and switch 36 (latch) |

It will be apparent from the foregoing that the verification controller in the central station 16 must be properly synchronized with the network termination unit 20 in order to effect the various measurements on the telephone line in a timed relationship with the actuation sequence of the various semi-conductor switches.

In telephone line applications the power supply module 33 is being continuously charged by the talk battery, while the logic module 32 is in the quiescent state. Consequently, the network termination unit 20 can initiate the test sequence immediately upon reception of the trigger signal. However, when the network termination unit 20 is used on a dedicated data transmission line which has no talk battery, a preliminary step must be performed before triggering the logic module 32, in order to charge the power supply module 33. This is accomplished by impressing across the conductors of the line a voltage of a magnitude significantly exceeding the amplitude of the signals normally transmitted on the line, for a time period sufficient to fully charge the capacitor 88.

The network termination unit 20 as described above is well-suited for use on telephone lines which continuously carry a talk battery established across the tip and ring conductors. This DC voltage is used for supplying power to the logic module 32 in its quiescent state, allowing to maintain the switches 34 and 36 in a short-circuited state to permit normal propagation of signals on the line. It will be appreciated that the absence of the DC component will cause the switches 34 and 36 to assume the opened condition, thereby breaking the continuity of the telephone line. In order to allow the network termination unit 20 to be used on communication lines with no DC component across its conductors, such as dedicated data transmission lines which are designed to carry only weak signals with no superimposed talk battery, the switches 34 and 36 are replaced by semi-conductor switches that remain in the closed condition in absence of electric power applied thereto. The so-called "depletion FET" devices have been found satisfactory in this regard, permitting to maintain the line in a normal state of conduction when the logic module 32 is in the quiescent state. In such applications, the remaining semi-conductor switches of the network termination unit 20 are of the normally closed type to automatically assume the open-circuited state when the logic module 32 goes in the quiescent state.

Figure 6:
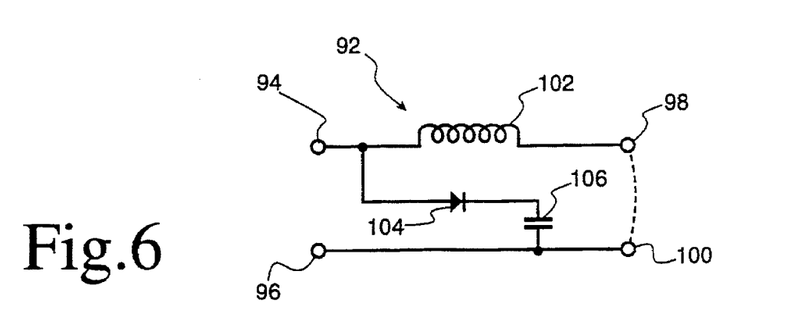
FIG. 6 is a schematical diagram of a power supply module constructed in accordance with the variant.

FIG. 6 is a schematical diagram of a power supply module for the network termination unit, in accordance with a variant. The power supply module, identified by the reference numeral 92, presents certain advantages over the power supply module 33 previously described which reside in its ability to recharge itself even when the tip and ring conductors of the line are short-circuited downstream of the network termination unit 20, that is somewhere between the network termination unit and the handset 18. More particularly, the power supply module 92 comprises input leads 94 and 96 connected to the tip and ring conductors respectively of the network side of the line and output leads 98 and 100 connected to the tip and ring conductors of the customer side of the line. An inductance 102, in the form of a coil, is mounted in series with the tip conductor. A diode 104 in series with a capacitor 106 are connected across the tip and the ring conductors of the line at a position upstream of the inductance 106.

Assuming that a short circuit condition exists across the output leads 98 and 100, as shown in dashed lines in FIG. 6, it will be apparent that the talk battery located at the central station 16 will not be capable of charging the capacitor 106. However, by applying across the tip and the ring conductors of the telephone line a variable voltage, such as periodic voltage pulsations, the voltage potential generated across the inductor 102 in response to the variable current passing therethrough will be able to pump in the capacitor 106 an electric charge sufficient to power the logic module 32 of the network termination unit 20.

The purpose of the diode 104 is to prevent the capacitor 106 from discharging itself through the short circuit on the telephone line.

During the diagnostic routine performed on the telephone line by the verification controller in conjunction with the network termination unit, it is often necessary to conduct impedance measurements on the line to determine for example, the resistance of the loop formed by the tip and the ring conductors, or the resistance of each conductor with respect to ground to ascertain if the line is balanced. The network termination unit in accordance with the invention is well-suited for this purpose by establishing at the demarcation point the desired electrical path between the line conductors and ground to enable the verification controller to make the required impedance measurements. However, the semi-conductor switches used to alter the electrical path of the line have an inherent resistance which significantly affects the accuracy of the measurements.

To enable a relatively precise impedance measurements to be performed without the necessity of utilizing expensive semi-conductor switches having an intrinsic resistance which is subject only to minimal variations from one unit to another, the present invention provides a novel semi-conductor switch array and a method of use permitting to determine with accuracy during an impedance measurement the parasitic resistance of the switch in order to derive a correction factor. The semi-conductor switch array is identified comprehensively by the reference numeral 108 in FIG. 7. The switch array 108, is manufactured on a silicon chip by a well-known large scale integration technique and includes a pair of individual switches 110 and 112 which are connected in parallel to the main terminals of the switch array 108. The switches 110 and 112 are identical in construction to the switch shown in FIG. 3 and comprise actuation terminals 114 and 116, respectively, permitting an independent actuation of switches 110 and 112.

Figure 7:
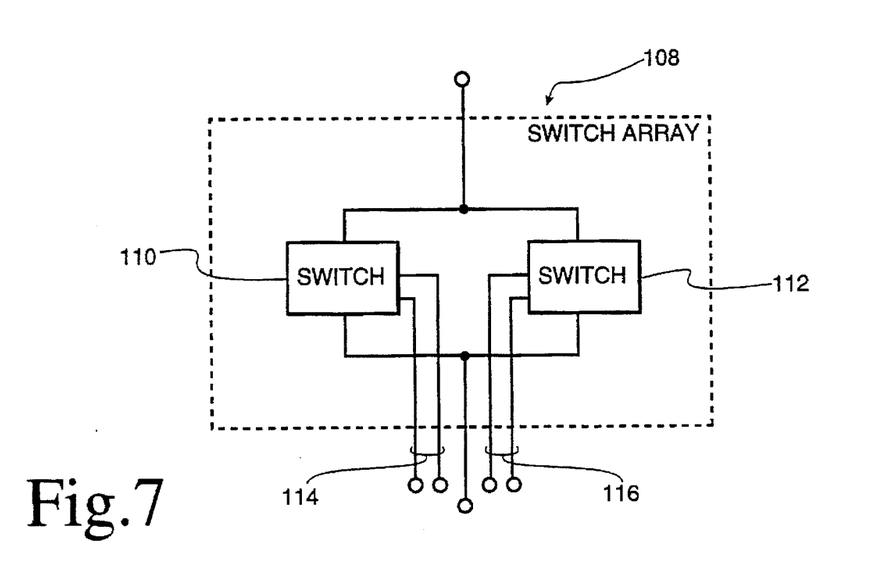
FIG. 7 is a schematical view of a semi-conductor switch in accordance with a variant.
Figure 8:
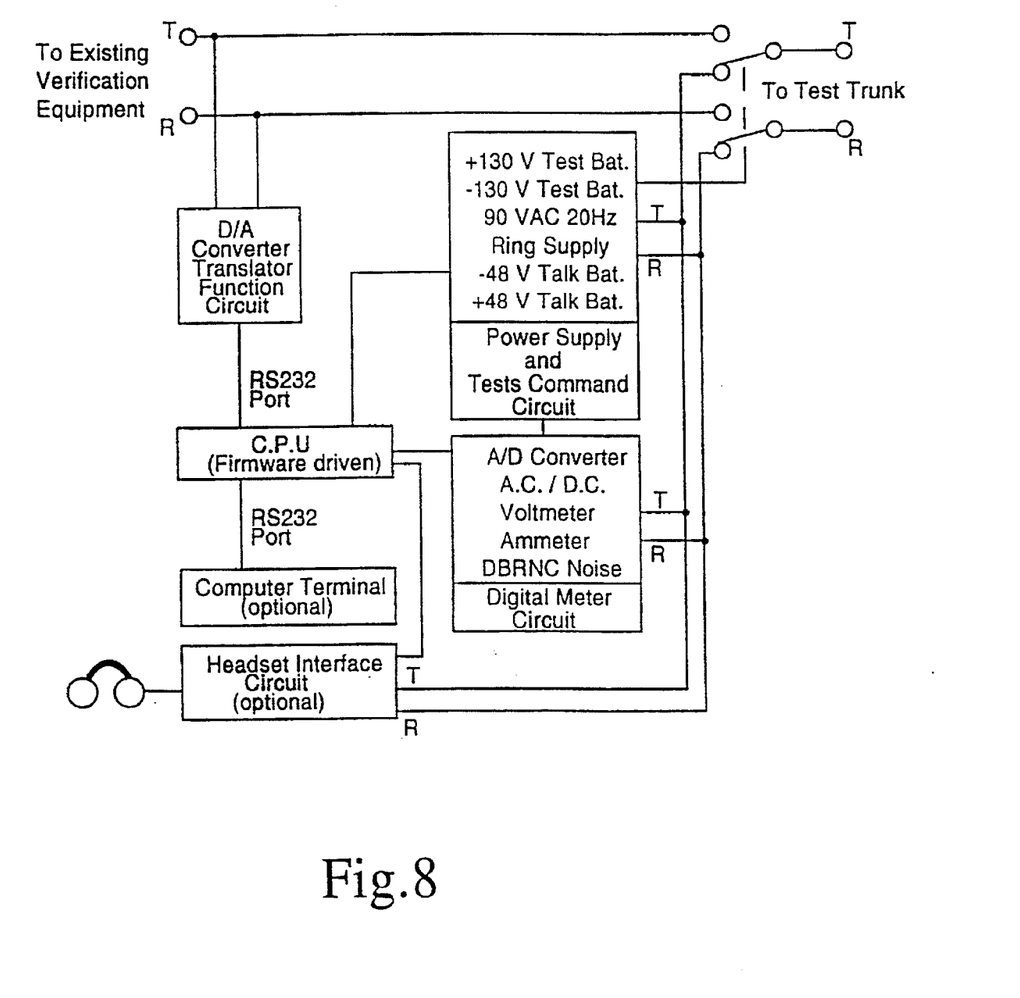
FIG. 8 is a block diagram of a verification controller cooperating with the network termination unit in accordance with the invention to perform a diagnostic routine on the communication line.

Since the switch array 108 is produced on a single silicon chip, the individual switches 110 and 112 have approximately the same intrinsic resistance due to the fact that they have been manufactured under identical process conditions. Although various switch arrays made during different production runs may have widely varying impedance values, individual switches on the array are virtually identical enabling to determine from the central station 16 the parasitic impedance of the switch array 108, in accordance with the following method.

Assuming that one wishes to determine the resistance of the loop formed by the tip and ring conductors of the telephone line in conjunction with the network termination unit, the dual switch array 108 is substituted to the unitary switch 42 and the program of the logic module 32 is modified in order to allow successive actuation of the individual switches 110 and 112.

The first step for measuring the loop resistance between the tip and ring conductors consists of closing only switch 110 during a predetermined time period to enable the verification controller at the central station 16 to effect a first resistance measurement. During a second time period, the individual switches 110 and 112 are both set in a state of conduction and another resistance measurement is made. Based on the hypothesis that the switches 110 and 112 have an identical resistance, the difference between the resistance values obtained during the consecutive measuring steps can be used to derive the individual resistance of the switches 110 and 112. More specifically, it can be shown from elementary circuit analysis equations that the difference between the two resistance measurements represents half the resistance of an individual switch of the array 108.

Once the resistance of an individual switch has been determined it is subtracted from the resistance value measured during the first time period to obtain an accurate value of the loop resistance.

An important advantage of the dual switch array 108 and the method of use thereof resides in that the calculated resistance values for the individual switches are corrected for drift due to thermal variations. The network termination unit 20 which is designed for use in harsh environmental conditions is likely to experience widely varying temperatures, in the range from −40 to +40 degrees celsius, causing significant changes of the resistance of the switches 110 and 112. The present invention obviates any potential difficulty in this respect by determining the resistance of the switches based on remote direct measurements without relying on nominal resistance values.

A dual switch array 108 may be substituted to each of the individual switches 38 and 40 of the network termination unit 20 to allow measurements of the resistance to ground of the tip and ring conductors, respectively, by the method stated above. In turn, these measurements allow to determine whether the tip and the ring conductors form a balanced line.

A preferred embodiment of the verification controller will now be described in connection with FIGS. 8, 9, 10 and 11.

POWER SUPPLY AND TEST COMMAND CIRCUIT

Figures 9, 9A:
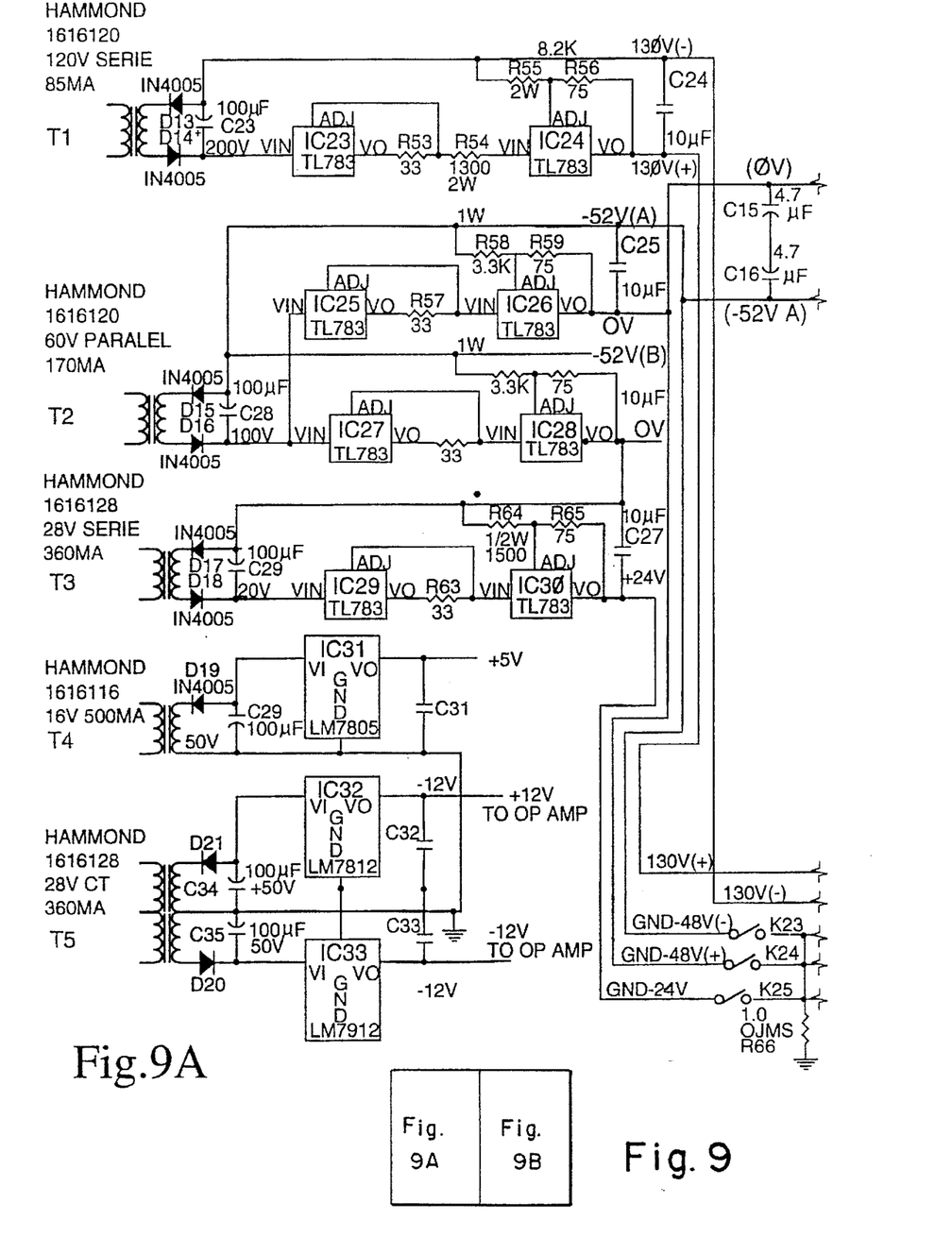
FIG. 9 is a detailed schematical diagram of the verification controller shown in FIG. 8.
Figure 9B:
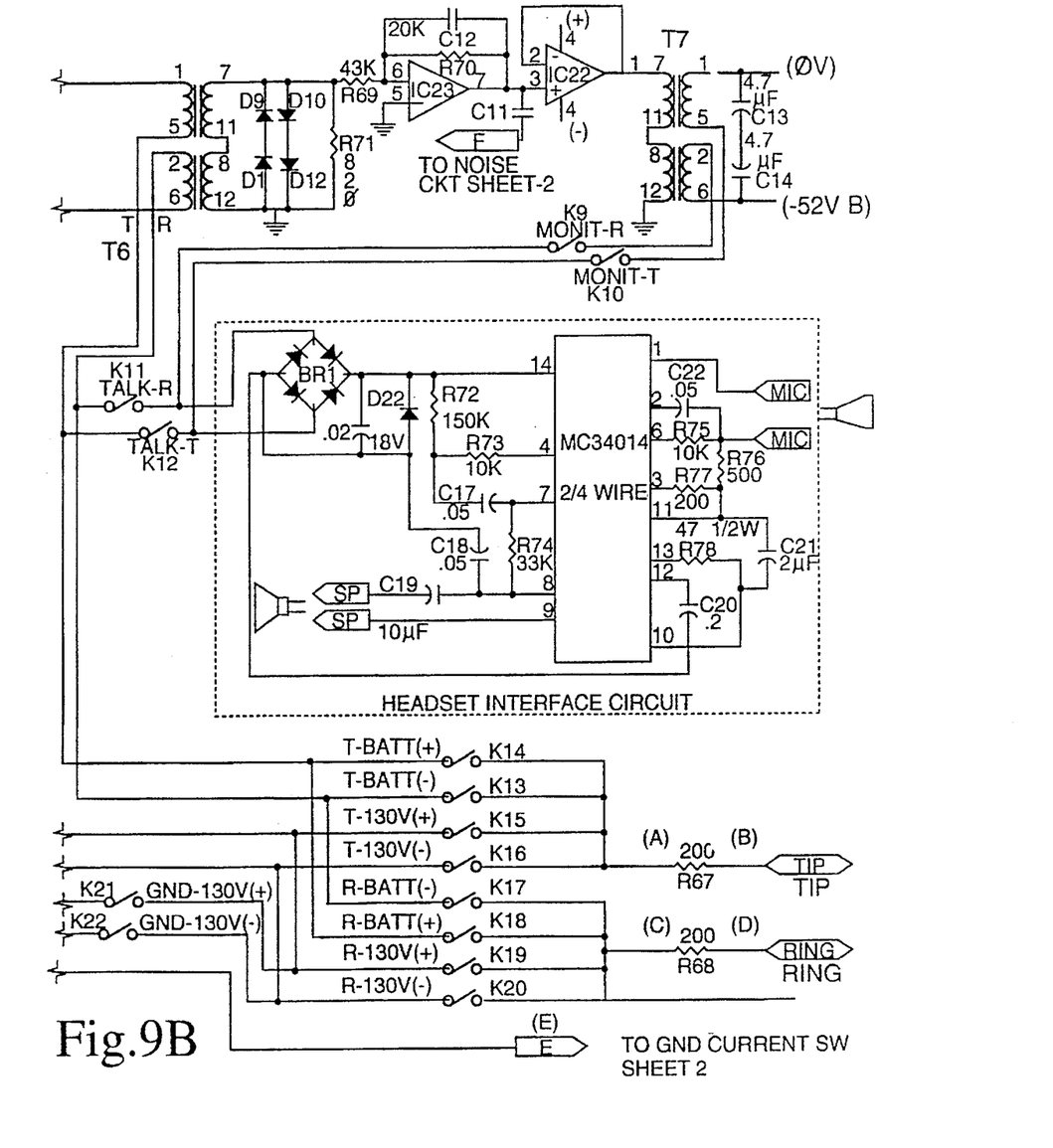

Transformer T1, diodes D13 and D14 and capacitor C23 make up the 130 V.D.C. power supply. Voltage Regulation and filtering is achieved with voltage regulators IC23, IC24, resistor R53, R54, R55, R56 and capacitor C24. The ±130 V.D.C. supply voltage is used as a testing voltage during the verification tests.

Transformer T2, diodes D15, D16 and capacitor C28 make up the 52 V.D.C. power supply. Voltage regulation and filtering is achieved with voltage regulators IC27, IC28, resistors R57, R58, R59 and capacitor C25.

The −52 V.D.C. supply voltage is used as talk battery during the verification tests for noise measurement and talk path purposes.

Transformer T3, diodes D17, D18 and capacitor C29 make up the +24 V.D.C. power supply. Voltage regulation and filtering is achieved with voltage regulators IC29, IC30, resistors R63, R64, R65 and capacitor C27.

The +24 V.D.C. supply is used for special testing functions reserved for future use. As can be seen from the schematic diagram the 24 V.D.C. supply can be added to the 52 V.D.C. supply to obtain a 76 V.D.C. supply.

Transformer T4, diode D19 and capacitor C30 make up the +5 V.D.C. power supply. Voltage regulation and filtering is achieved with voltage regulator IC31 and capacitor C31.

The +5 V.D.C. supply is used to power I.C.'s requiring a 5 V.D.C. supply voltage.

Transformer T5, diodes D20, D21 and capacitors C34, C35 make up the ±12 V.D.C. dual power supply. Voltage regulation and filtering is achieved with voltage regulators IC32, IC33 and capacitors C32 and C33. The ±12 V.D.C. supply is used to power I.C.'s requiring a ±12 V.D.C. dual supply.

Transformer T6, capacitors C15 and C16 serve as a talk path circuit during the noise tests and for talk path requirements when using the headset.

Diodes D9, D10, D11 and D12 across the secondary of T6 act as transient clamping diodes to protect the O.P. amp IC21.

Resistor R71 terminates the secondary of transformer T6 at 600 ohms impedance.

Operational amplifier IC21, resistors R69, R70 and capacitors C12 and C11 is a noise amplifying circuit whose output is connected to the noise input of the Digital Meter Circuit. Operational amplifier IC22 is a buffer amplifier drives the primary winding of transformer T7. The secondary of transformer T7, capacitors C13 and C14 are connected to the −52 V.D.C. talk path supply. This talk path circuit provides talk path battery supply to the Headset Interface Circuit for noise monitoring.

Relays K11 and K12 connect the tip and ring of the line under test to the Headset Interface Circuit when the tester desires to talk on the line.

Relays K9 and K10 connects the output of the noise amplifier circuit to the input of the Headset Interface Circuit for noise monitoring applications. When these relays are operated, relays K11 and K12 are normally disconnected.

Relays K13 and K14 connect the −52 V.D.C. and +52 V.D.C. talk path a to the tip conductor of the line under test. These relays are operated during noise monitoring, noise measurement and talk path functions. Note: The reason for applying either a + or − polarity is to permit performing each test in both forward and reverse polarity.

Relays K14 and K15 connect the +130 V.D.C. and −130 V.D.C. test supply voltages to the tip conductor of the line under test.

Relays K17 and K18 connect the −52 V.D.C. and +52 V.D.C. talk path to the ring conductor of the line under test.

Relays K19 and K20 connect the +130 V.D.C. and −130 V.D.C. test voltages to the ring conductor of the line under test.

Figures 10, 10A:
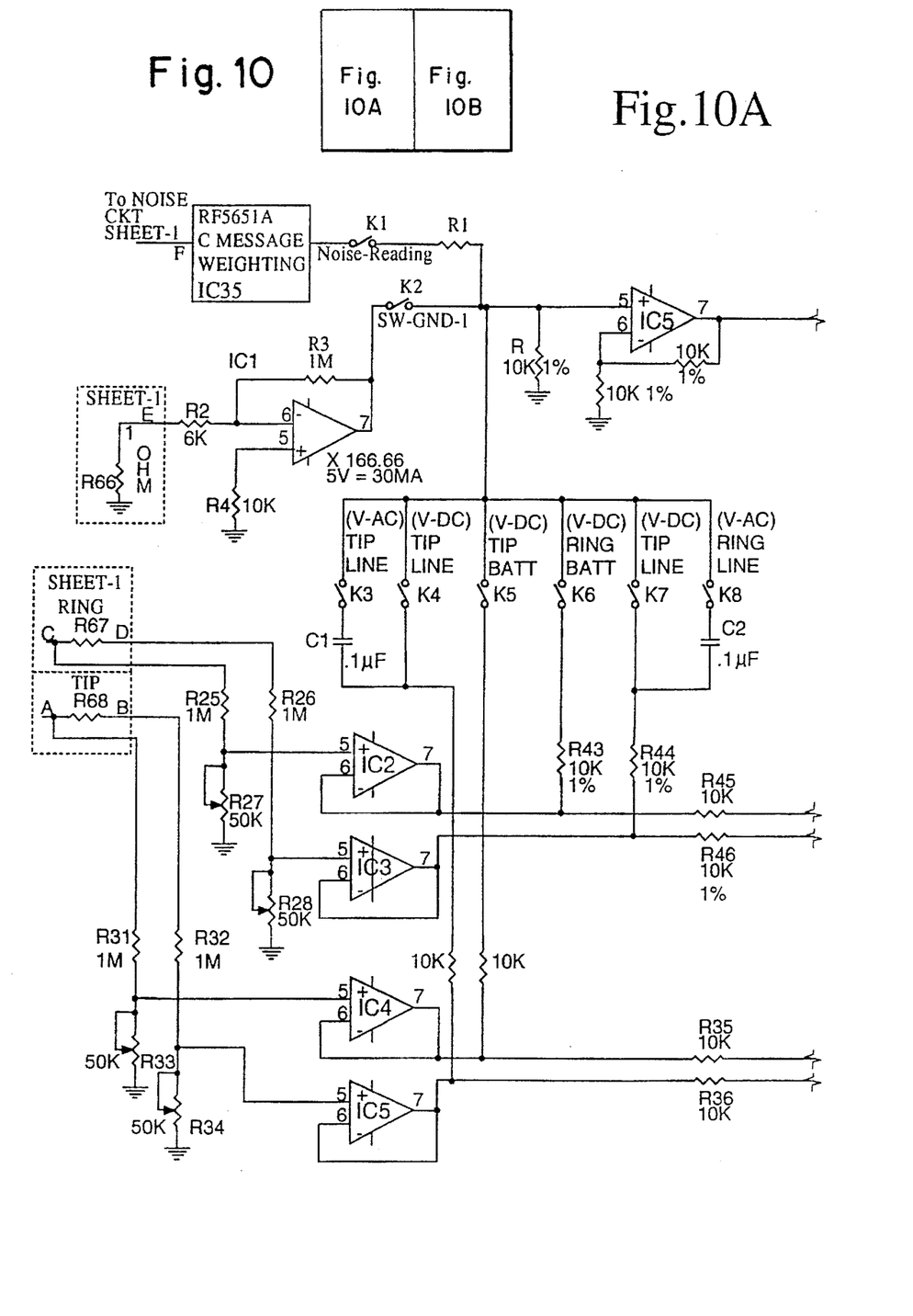
FIG. 10 is a detailed schematical diagram of a digital metering circuit of the verification controller.
Figure 10B:
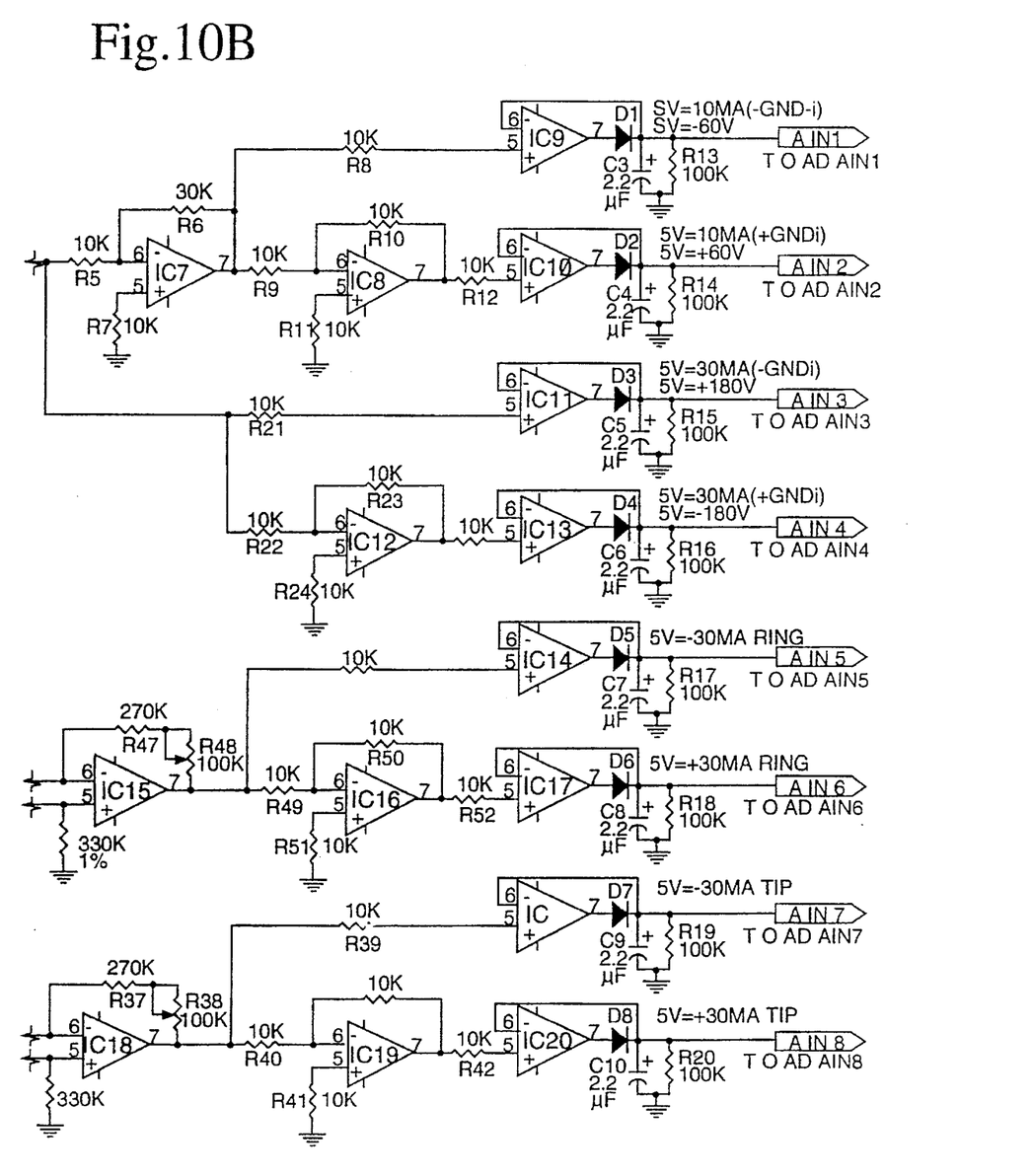
Figure 11:
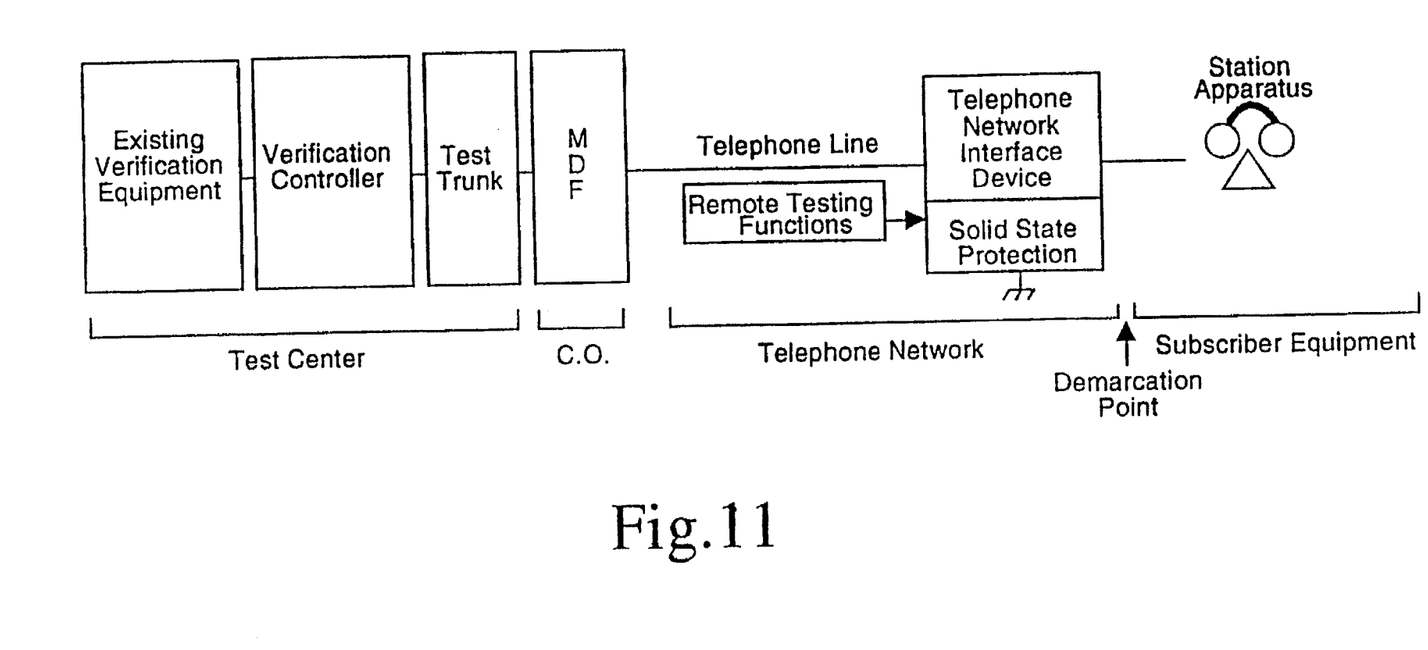
FIG. 11 is a block diagram of a typical application showing the verification controller, the communication line, the network termination unit and the customer wiring and equipment.

Resistors R67 and R68 are used as shunt resistors for line current measurements of the tip conductor and ring conductor respectively that are performed by the Digital Meter Circuit.

DIGITAL METER CIRCUIT

The Noise Input is connected to the output of the noise amplifier circuit as described above in the Power Supply and Test Command Circuit.

The noise input is fed through a "C"MSG weighting active filter IC35 for performing noise tests in DBRNC "C" MESSAGE WEIGHTING. The output of the filter is connected to relay K1 and R1 which is connected to the input of the differential amplifier IC6 to phase 6.

Operational amplifiers IC6, IC7, IC8, IC12, IC3 and resistors R5, R6, R7, R8, R9, R10, R11, R12, R22, R23 and R24 function as differential instrumentation amplifiers whose outputs are buffeted as follows:

O.P. AMP. IC9, diode D1, capacitor C3 and resistor R13 is a buffer and peak detector circuit whose output is connected to the input of an A/D converter in the C.P.U. This circuit functions as a negative polarity ammeter in the 0–10 M.A. scale range or as a negative polarity voltmeter in the 0–60 volts scale range.

O.P. amp IC10, diode D2, capacitor C4 and resistor R14 is a buffer and peak detector circuit whose output is connected to the input of an A/D converter in the C.P.U. This circuit functions as a positive polarity voltmeter in the 0–60 volts scale range.

Relays K23, K24, K25, K21 and K22 apply −48 V.D.C., +48 V.D.C., +24 V.D.C., +130 V.D.C. or −130 V.D.C. to earth ground respectively during the different test functions.

Resistor R66 acts as a shunt resistor for current measurements during the tests.

The test command circuit is controlled by the C.P.U. and provides a series of tests functions according to a Telco's specific requirements. FIG. 4 is a table of the verification controller testing sequence.

Analog outputs 3–8 are comprised of operational amplifiers IC11 through IC20, associated resistors, diodes and capacitors circuitry that function in the identical manner as the equivalent circuitry described above for the analog outputs 1 and 2.

Resistors R67 and R68 are shunt resistors in series with the ring and tip conductors respectively of the line being tested. These shunt resistors are used for the current reading functions.

Resistor R66 is a shunt resistor in series with the earth ground supply testing circuit. This shunt resistor is used for the current readings functions. IC1 is an Operational Amplifier whose gain is controlled by resistors R2 and R3 and referenced to common ground with resistor R4. The amplifier reads the voltage across shunt resistor R66 and thereby provides a current reading of the current to ground during the verification tests. The output of IC1 is connected through relay K2 to the input of operational amplifier IC6.

Resistor R25 and R27, R26 and R28, R31 and R33 and R32 and R34 serve as voltage dividers whose outputs are buffeted by operational amplifiers IC2, IC3, IC4, IC5 respectively. The outputs of these operational amplifiers are fed to the respective inputs of IC5 and IC18 whose functions have just been described in the above description. The same outputs are also fed to the input of IC6 via relays K3–K18. The relays are controlled by the C.P.U. and perform the series of testing functions more fully described below:

Analog Output 1:
  0–10 M.A. scale A.C./D.C. (−) Polarity
  0–60 Volts scale A.C./D.C. (−) Polarity
  0–90 DBRNC "C" MESSAGE Noise (−) Polarity
Analog Output 2:
  0–10 M.A. scale A.C./D.C. (+) Polarity
  0–60 Volts scale A.C./D.C. (+) Polarity
  0–90 DBRNC "C" MESSAGE Noise (+) Polarity
Analog Output 3:
  0–30 M.A. scale A.C./D.C. (+) Polarity
  0–60 Volts scale A.C./D.C. (+) Polarity
Analog Output 4:
  0–30 M.A. scale A.C./D.C. (−) Polarity
  0–180 Volts scale A.C./D.C. (−) Polarity
Analog Output 5:
  0–30 M.A. scale D.C. (−) Polarity (Ring)
Analog Output 6:
  0–30 M.A. scale D.C. (+) Polarity (Ring)
Analog Output 7:
  0–30 M.A. scale D.C. (−) Polarity (Tip)
Analog Output 8:
  0–30 M.A. scale D.C. (+) Polarity (Tip)

All analog outputs are connected to the C.P.U. analog to digital (A/D) inputs for processing.

It will be appreciated that the verification controller and the network termination unit 20 must be properly synchronized in order to perform the diagnostic routine on the telephone line. This is acheived by programming the verification controller to effect measurements in a timed relationship with the evolution of the switches actuation sequence at the demarcation point.

The scope of the present invention is not limited by the description, examples and suggestive uses herein, as modifications can be made without departing from the spirit of the invention. Thus, it is intended that the present application covers the modifications and variations of this invention provided that they come within the scope of the appended claims and their equivalents.

I claim:

1. A device for altering the electrical condition of a communication line to allow impedance measurements to be performed on the communication line at a remote location from said device, said device comprising:

first and second switches formed on a single semiconductor chip for connection in parallel to a first conductor of the communication line, each switch establishing a respective electrical path capable of altering the electrical condition of the communication line, each switch being capable of assuming an opened condition and a closed condition for controlling a state of conduction of a respective electrical path, in said opened condition each switch manifesting a high impedance to substantially prevent passage of electrical current therethrough, in said closed condition each switch manifesting a low impedance to allow passage of electrical current therethrough, said first and second switches having similar impedance characteristics; and a logic module means for
  a) actuating said first and second switches to either condition thereof;
  b) during a first time interval, maintaining said first switch in said closed condition and maintaining said second switch in said opened condition; and
  c) during a second time interval, maintaining said first and second switches in said closed condition, whereby successive impedance measurements of the communication line during said first and second time intervals permits a determination with relative precision of a parasitic impedance of said first and second switches.

2. A device as defined in claim 1, wherein said first and second switches establish respective electrical paths from the first conductor of the communication line toward a second conductor of the communication line.

3. A device as defined in claim 1, wherein said first and second switches establish respective electrical paths from the first conductor of the communication line toward ground.

4. A device as defined in claim 1, wherein said logic module is responsive to a trigger signal for initiating a sequence of actuation of said first and second switches.

5. A method for measuring impedance parameters of a communication line, said method comprising the steps of:
  a) connecting at a certain location on the communication line first and second switches formed on a single semiconductor chip, in parallel to a first conductor of the communication line, each switch establishing a respective electrical path for altering the electrical condition of the communication line, each switch being capable of assuming an opened condition and a closed condition for controlling a state of conduction of a respective electrical path, in said opened condition each switch manifesting a high impedance to substantially prevent passage of electrical current therethrough, in said closed condition each switch manifesting a low impedance to allow passage of electrical current therethrough, said first and second switches having similar impedance characteristics;
  b) maintaining said first switch in said closed condition and said second switch in said opened condition for a first time period;
  c) measuring an impedance parameter of the communication line at a point remote from said certain location during said first time period;
  d) maintaining said first and second switches in said closed condition during a second time period;
  e) measuring an impedance parameter during said second time period;
  f) deriving from impedance values obtained at steps c) and e) a correction factor representative of a parasitic impedance of said first and second switches; and
  g) utilizing said correction factor to derive with a relative precision a value of an impedance parameter of the communication line.

6. A method as defined in claim 5, comprising the step of connecting said first and second switches to the communication line to provide respective electrical paths from a first conductor of the communication line toward a second conductor thereof to determine impedance of a loop formed by the first and second conductors of the communication line.

7. A method as defined in claim 5, comprising the steps of connecting said first and second switches to the communication line to provide respective electrical paths from a first conductor of the communication line toward ground, determining an impedance value of the first conductor to ground, determining an impedance value of a second conductor of the communication line to ground, ascertaining whether the first and the second conductors form a balanced circuit.

* * * * *